R. B. KING.
REEL BRAKE FOR FISHING RODS.
APPLICATION FILED MAR. 10, 1916.
1,227,273.
Patented May 22, 1917.
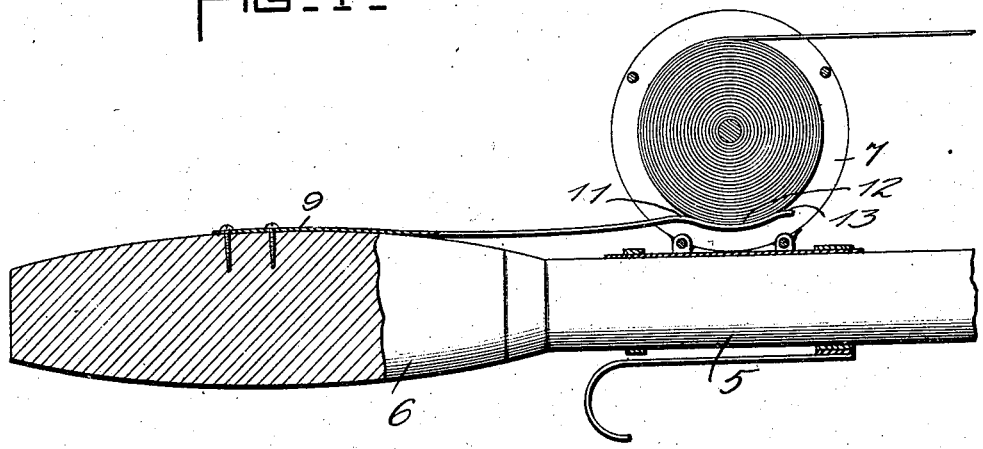
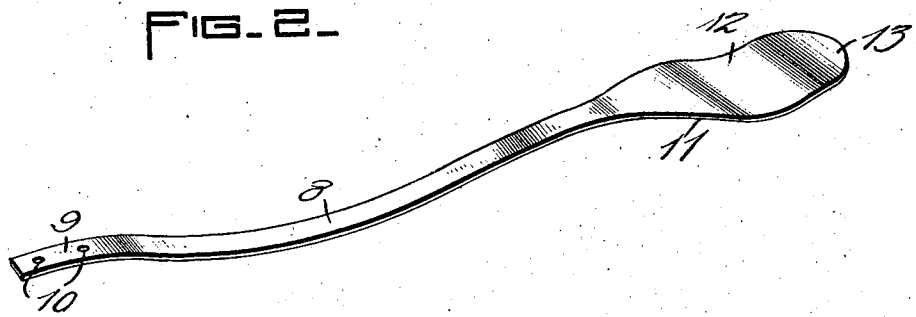
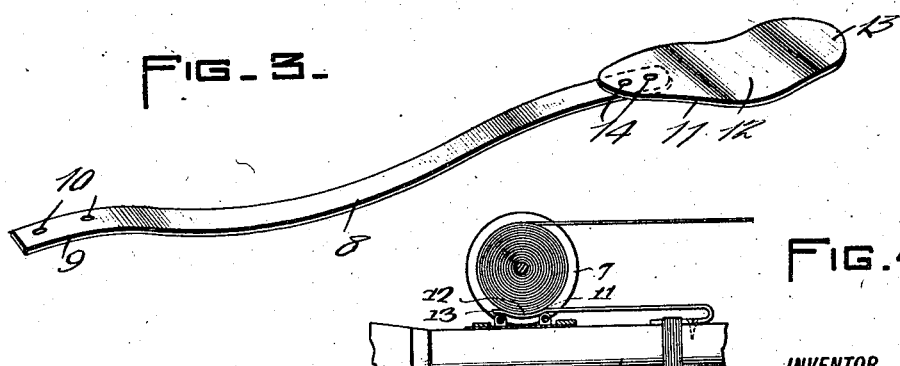
WITNESSES:
John N. Phillips Jr.
Alart F. Garner.
INVENTOR
ROSWELL B. KING,
BY
ATTORNEYS

UNITED STATES PATENT OFFICE.

ROSWELL BAYARD KING, OF PENSACOLA, FLORIDA.

REEL-BRAKE FOR FISHING-RODS.

1,227,273.

Specification of Letters Patent.     Patented May 22, 1917.

Application filed March 10, 1916. Serial No. 83,324.

*To all whom it may concern:*

Be it known that I, ROSWELL B. KING, a citizen of the United States, and a resident of Pensacola, in the county of Escambia and State of Florida, have invented a certain new and useful Improvement in Reel-Brakes for Fishing-Rods, of which the following is a specification.

One of the principal objects of my invention is to provide an improved means for regulating the tension on a fishing rod reel, so that the fisherman will not have to use his thumb in controlling the reel, and whereby the "back lash" ordinarily occurring when casting, if the reel is under no control, will be eliminated.

A further object of my invention is to provide an improved device of the class described, which will be extremely simple, durable, efficient in operation, and inexpensive to manufacture.

With these and other objects in view which will become apparent as the description proceeds, the invention resides in the construction, combination, and arrangement of parts hereinafter more fully described and claimed, and illustrated in the accompanying drawing in which like characters of reference indicate like parts throughout the several figures, of which—

Figure 1 represents a view partly in section, of a fishing pole handle, showing the invention as applied thereon.

Fig. 2 represents a perspective view of the device detached.

Fig. 3 represents a similar view of a modified form of the invention.

Fig. 4 represents a view partially in section, representing the brake as attached to the pole in advance of the reel.

Referring more particularly to the drawing, a fishing rod is indicated generally at 5, the handle at 6, and the reel at 7. The brake or retarding device may be made of a single piece of suitable spring material as indicated in Fig. 2, or may be made of a plurality of pieces, as indicated in Fig. 3. The brake consists of a resilient shank 8 which preferably is curved longitudinally, and which at its rear end 9 is provided with openings 10 for the reception of fastening means, such as screws or tacks. The rear portion 9 of the shank lies upon the handle 6, extending longitudinally thereof, and is of a formation to conform with the configuration of the handle. It will, of course, be understood that any suitable means may be used for attaching the shank to the handle, such as by winding the handle with tape. If desired, the handle may be recessed for receiving the rear end portion of the shank. The invention can also be attached on the pole in front of the reel extending under the reel toward the handle.

At the forward end of shank 8 is carried a tongue 11 which forms a seat in which the line, when reeled up, rests. This tongue is concaved as at 12 at its central portion, the curvature of the concaved portion being of a degree substantially coincident with the degree of curvature of the circumference of the reel. The outer end of the seat bears outwardly and downwardly as at 13, so as not to engage with or tear the line. As shown, the seat 12 may be made integrally with the shank 8, or, if desired, as indicated in Fig. 3, may be made separately therefrom and suitably secured thereto by means of rivets or other fastening means 14.

When in position on the rod, it will be noted that the seat 12 is arranged underneath the reel and bears upwardly against the reel line, being held in contact therewith through the action of the resilient shank 8.

The braking action exerted upon the reel in casting will prevent the disadvantages attending the use of an uncontrolled reel, and the device will be found to be of extreme convenience and usefulness.

Although I have described the preferred embodiment of my invention, I may desire to make such changes in the construction, combination, and arrangement of parts thereof, as do not depart from the spirit of the invention and the scope of the appended claims.

I claim:—

1. The combination with a fishing rod and a reel mounted thereon, of a braking device including a resilient shank having at one end a reel seat positioned between the reel and the rod and affording a concaved portion frictionally bearing against the line on the reel, and means affixing the opposite end of the shank to the rod, said braking device being so positioned on the rod that the braking effect may be controlled by the hand which grasps the rod.

2. The combination with a fishing rod and a reel mounted thereon, of a resilient shank fixed on the rod and having a tongue portion projecting between the reel and the rod and frictionally bearing against the line on the reel, said resilient shank being so positioned on the rod that the braking effect of the tongue portion may be controlled by the hand which grasps the rod.

ROSWELL BAYARD KING.